US012617244B2

(12) United States Patent
Bonora et al.

(10) Patent No.: US 12,617,244 B2
(45) Date of Patent: May 5, 2026

(54) CENTRAL TIRE INFLATION SYSTEM WITH WHEEL HUB INCLUDING INTEGRATED SEALING SURFACE

(71) Applicant: DANA ITALIA S.R.L., Arco (IT)

(72) Inventors: Mario Bonora, Tenno (IT); Alessandro Strauss, Rovereto (IT); Giovanni Mariech, Rovereto (IT); Alberto Cis, Ledro (IT)

(73) Assignee: DANA ITALIA S.R.L., Arco (IT)

( * ) Notice: Subject to any disclaimer, the term of this patent is extended or adjusted under 35 U.S.C. 154(b) by 783 days.

(21) Appl. No.: 17/814,398

(22) Filed: Jul. 22, 2022

(65) Prior Publication Data

US 2024/0025216 A1     Jan. 25, 2024

(51) Int. Cl.
B60C 23/00 (2006.01)

(52) U.S. Cl.
CPC .. B60C 23/00363 (2020.05); B60C 23/00345 (2020.05); B60C 23/00381 (2020.05)

(58) Field of Classification Search
CPC ........ B60C 23/00363; B60C 23/00381; B60C 23/00305; B60C 23/00345
See application file for complete search history.

(56) References Cited

U.S. PATENT DOCUMENTS

| | | | | |
|---|---|---|---|---|
| 4,216,972 A | * | 8/1980 | Domes | B60B 27/02 |
| | | | | 277/374 |
| 4,640,331 A | * | 2/1987 | Braun | B60C 23/00354 |
| | | | | 152/416 |
| 6,199,611 B1 | * | 3/2001 | Wernick | B60C 23/00381 |
| | | | | 152/417 |
| 8,505,600 B2 | | 8/2013 | Padula et al. | |
| 8,915,274 B2 | * | 12/2014 | Eschenburg | B60C 23/00363 |
| | | | | 152/416 |
| 9,481,213 B2 | * | 11/2016 | Keeney | B60C 23/00345 |
| 9,499,015 B2 | * | 11/2016 | Bittlingmaier | B60C 23/00354 |
| 10,011,150 B2 | * | 7/2018 | Bonora | B60C 23/00363 |
| 10,272,728 B2 | | 4/2019 | Nelson et al. | |
| 11,260,498 B2 | * | 3/2022 | Lu | H01L 21/6831 |
| 11,602,952 B2 | * | 3/2023 | Shah | B60B 27/0073 |
| 2002/0112802 A1 | * | 8/2002 | D'Amico | B60C 23/0039 |
| | | | | 152/415 |
| 2011/0037234 A1 | * | 2/2011 | Balsells | F16J 15/3212 |
| | | | | 277/549 |

FOREIGN PATENT DOCUMENTS

| | | |
|---|---|---|
| DE | 10064231 A1 | 9/2001 |
| EP | 0588595 A1 | 3/1994 |
| EP | 3164273 B1 | 9/2018 |
| FR | 2874671 A1 | 3/2006 |
| WO | 2013156430 A1 | 10/2013 |
| WO | 2014063873 A2 | 5/2014 |
| WO | 2018082963 A2 | 5/2018 |

* cited by examiner

*Primary Examiner* — Jason R Bellinger

(74) *Attorney, Agent, or Firm* — McCoy Russell LLP

(57) ABSTRACT

Various systems and methods are provided for a central tire inflation system with a wheel hub including an integrated sealing surface. In one embodiment, a system includes a vehicle wheel hub including a gas passage and a sealing surface shaped to engage directly with a seal to fluidly couple the gas passage to a counterpart gas passage of a stationary vehicle component. The sealing surface may be formed integrally with the vehicle wheel hub and shaped to engage directly with the seal with no other components disposed between the sealing surface and the seal.

17 Claims, 9 Drawing Sheets

CENTRAL TIRE INFLATION SYSTEM WITH WHEEL HUB INCLUDING INTEGRATED SEALING SURFACE

TECHNICAL FIELD

The present description relates generally to systems and methods for a central tire inflation system, and in particular, a central tire inflation system with a wheel hub including an integrated sealing surface.

BACKGROUND AND SUMMARY

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire longevity. Furthermore, tire inflation systems increase a vehicle's maneuverability over differing terrains, and increase a vehicle's mobility through varying environmental conditions. Additionally, tire inflation systems reduce maintenance requirements.

Tire inflation systems communicate pressurized fluid to a wheel assembly. Tire inflation systems often include pneumatic connections via pneumatic channels formed in the axle frame and the rotating wheel end. The channels may connect an onboard pneumatic compressor to the tire to provide for inflation and/or deflation of the tire according to user preference. Some systems include a bushing fitted on the wheel end to provide a mating surface for sealing lips to seal the pneumatic connections. However, such configurations may increase a number of sealing components and/or assembly complexity of the system.

In one example, the issues described above may be addressed by a system, comprising: a vehicle wheel hub including a gas passage and a sealing surface shaped to engage directly with a seal to fluidly couple the gas passage to a counterpart gas passage of a stationary vehicle component.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below.

DETAILED DESCRIPTION

Figure 1:
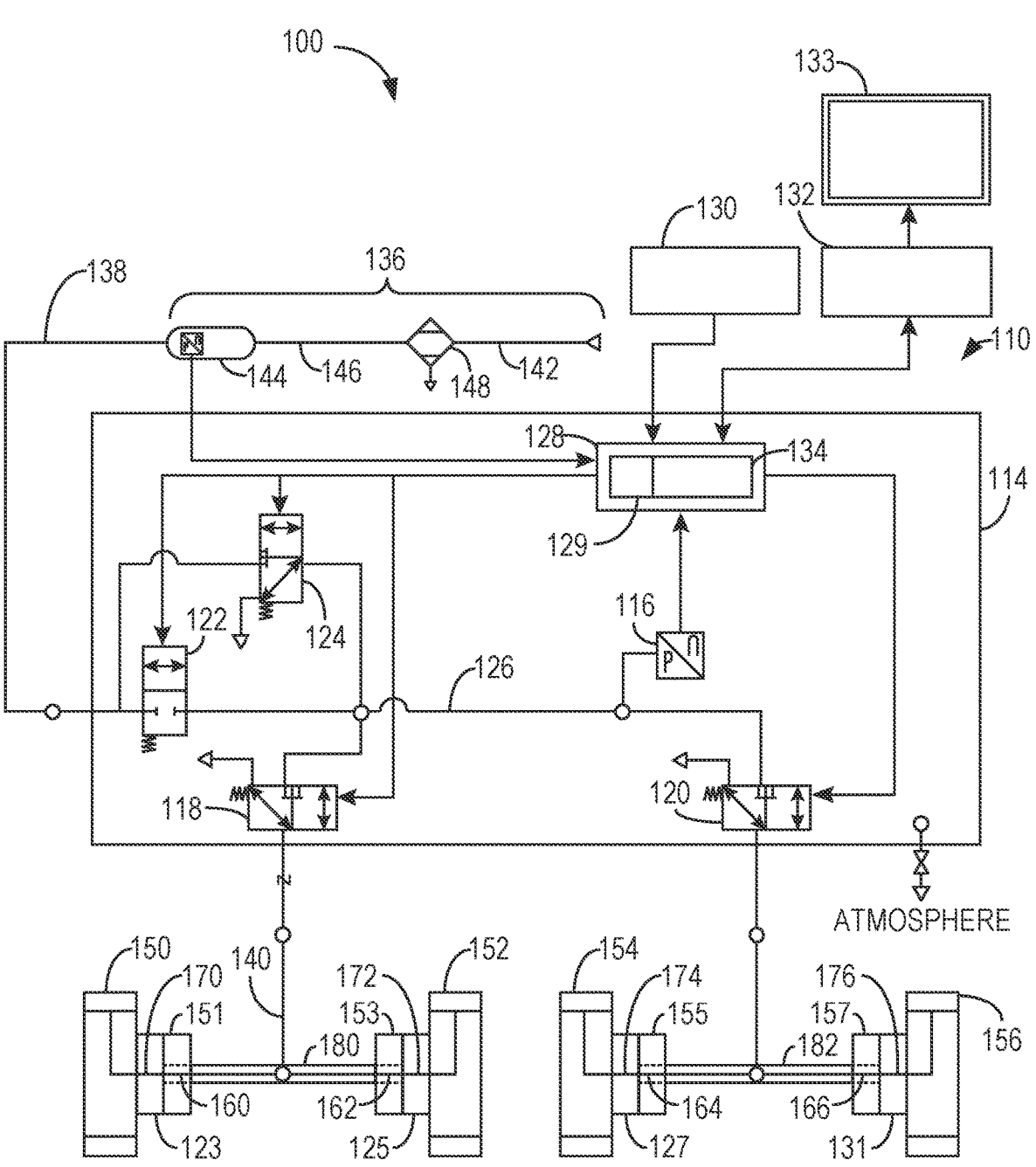
FIG. 1 schematically shows a vehicle including a central tire inflation system.

The following description relates to systems and methods for a central tire inflation system including an integrated sealing surface. A central tire inflation system (CTIS), such as the CTIS shown by FIG. 1, is configured to control pressurization of at least one tire of a vehicle. The CTIS includes a wheel hub with an integrated sealing surface, such as the wheel hub shown by FIGS. 2-3. The integrated sealing surface may be arranged at an interior side of the wheel hub, such as in the configurations shown by FIGS. 2-5, or an exterior side of the wheel hub, such as in the configurations shown by FIG. 6. The wheel hub with integrated sealing surface may be utilized with steering axles, such as in the configurations shown by FIGS. 2-6, or with non-steering rigid axles, such as in the configuration shown by FIG. 7. The CTIS may control the pressure of gases within the tire coupled to the wheel hub by controlling the flow of gas through components sealed via the integrated sealing surface, as shown by the flowchart of FIG. 8.

According to the present disclosure, a sealing surface of a CTIS is integrated directly into a wheel hub. The CTIS includes is configured with a sealing arrangement that integrates a rotary union and hub cap, where a sealing lip works directly on the wheel hub surface without the need for additional sealing components.

A CTIS is a system including components within a vehicle axle that controls pneumatic pressure within a tire coupled to the vehicle axle. The CTIS may control pneumatic pressure within multiple tires. For example, the CTIS may control pneumatic pressure within each of two tires arranged opposite to each other at opposing ends of the vehicle axle. The CTIS may increase pressure (e.g., gas pressure) within one or more of the tires by flowing gas to the one or more tires. The CTIS may also decrease pressure within one or more of the tires by venting gas from the one or more tires. CTIS systems may include a pneumatic circuit embedded in an end of the vehicle axle, where the pneumatic circuit includes involving several seals and counterparts configured to isolate a pneumatic medium (e.g., gas) from other axle portions (e.g., compartments). However, the numerous seals and counterparts may increase a cost (e.g., manufacturing cost, maintenance cost, etc.) of the CTIS and/or vehicle. For example, machining and/or installing the sealing surfaces and/or adding additional seals may increase costs of the CTIS, increase a maintenance time of the CTIS, etc. However, by configuring the CTIS with the sealing surfaces integrated directly into the wheel hub as described herein, the seals and counterpart components may be omitted and a cost and/or maintenance time of the CTIS may be reduced.

The CTIS provides a pneumatic connection between the stationary portion of the axle and the rotating wheel end. Some systems provide a pneumatic connection via pneumatic channels formed in the axle frame and the rotating wheel end. The channels may connect an onboard pneumatic compressor to the tire to provide for inflation and/or deflation of the tire according to user preference. The rotating wheel end is often formed from cast iron. However, the attributes of cast iron (e.g., hardness, smoothness, roughness, etc.) may increase a difficulty of sealing the pneumatic circuit. Some systems include a bushing fitted on the wheel end to provide a mating surface for sealing lips, where the bushing is made of a material different than cast iron. However, such systems additionally include at least two sealing components such as O-rings to provide sealing of a channel between the bushing and the wheel end surface. In addition to difficulties associated with machining the bushing component, a duration (e.g., length) of assembly is also increased. As a result, a cost of manufacturing and/or maintenance may be increased. Further, the higher number of sealing components may increase a likelihood of undesired flow of gases from the pneumatic circuit and/or tire.

Figure 5:
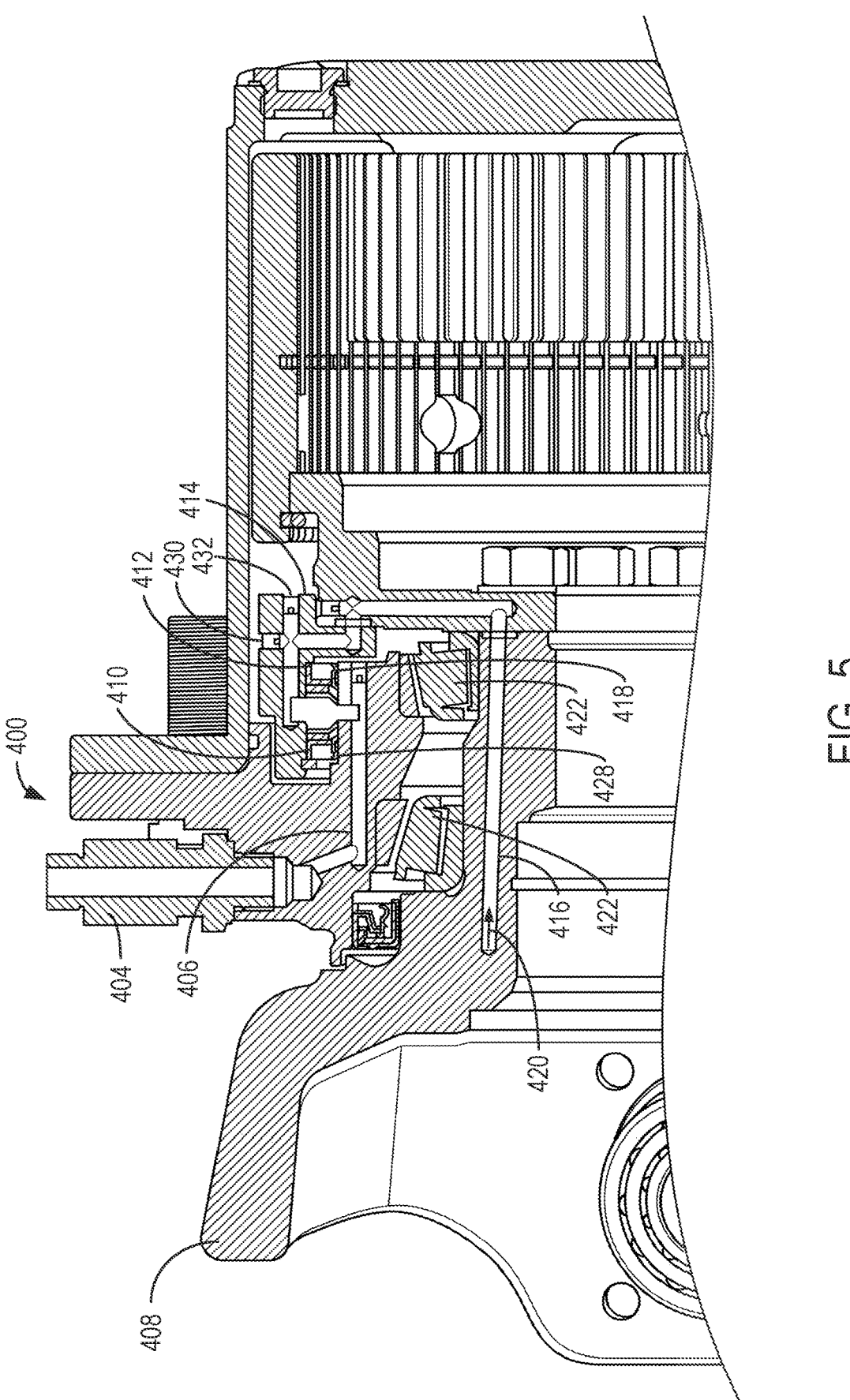
FIG. 5 shows an enlarged sectional view of the wheel hub of FIG. 4.
Figure 6:
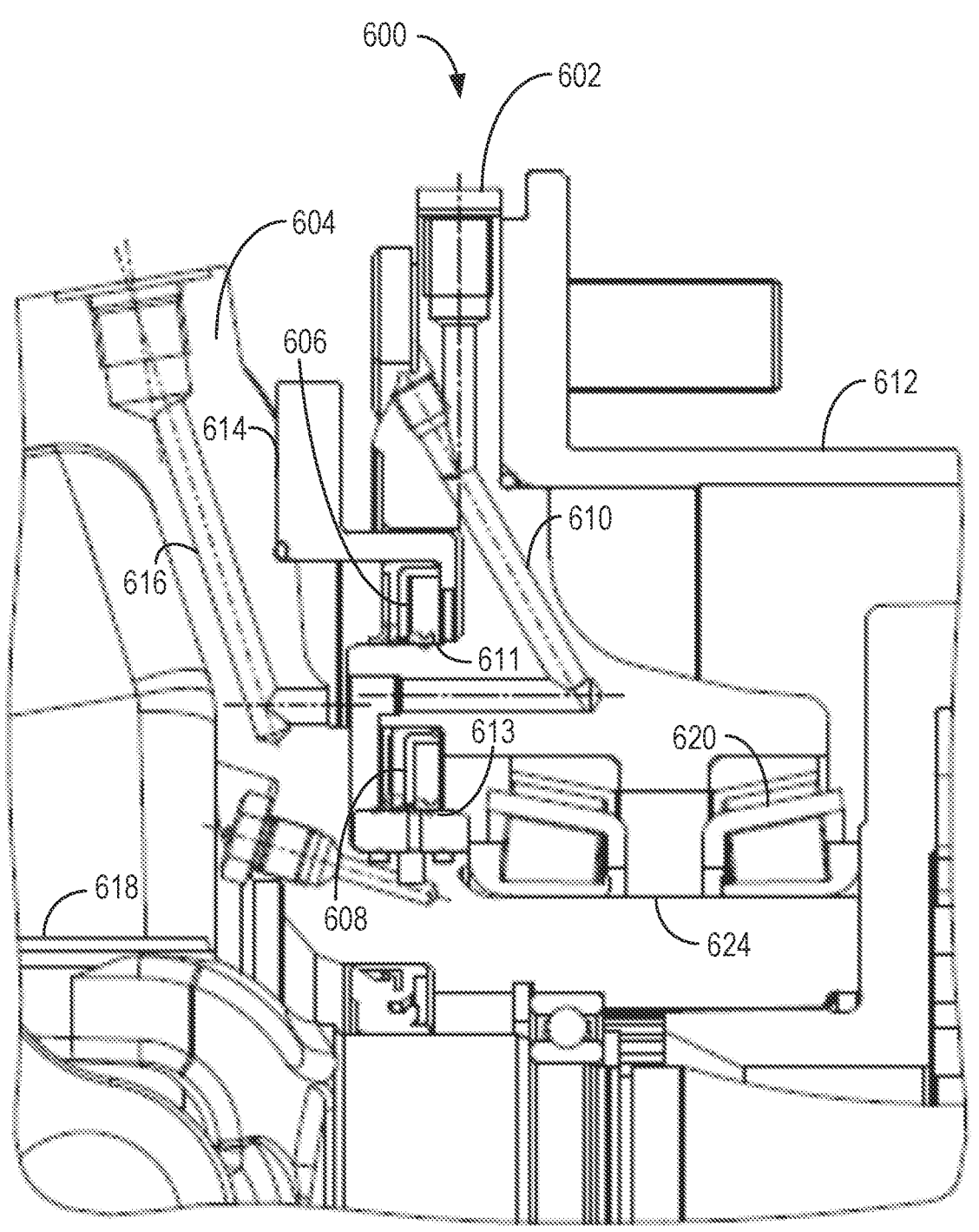
FIG. 6 shows a sectional view of another wheel hub including an integrated sealing surface.

According to the CTIS of the present disclosure, sealing of the wheel hub is provided without additional components. The material of the wheel hub provides increased hardenability and machinability properties such that the seal lips engage directly with the wheel hub surface without additional components such as O-rings. A steel wheel hub with localized surface hardening and successive grinding provides the desired surface parameters and replicates the sealing provided by the numerous seals and counterparts of other systems. The wheel hub material provides suitable hardenability and machinability properties such that the sealing lips may work directly on the wheel hub surface to seal the wheel hub surface without additional sealing components such as O-rings. In some embodiments, as shown by FIGS. 2-5, the sealing may be provided at an internal side (e.g., interior side) of the hub, and in other embodiments, as shown by FIG. 6, the sealing may be provided at an external side (e.g., exterior side) of the hub. The configurations described herein may be included for steering axles and/or rigid (e.g., non-steering) axles.

By integrating the sealing with the rotating wheel end, a complexity of assembly and/or manufacturing of the CTIS may be reduced (e.g., a number of components to assemble the CTIS may be reduced). For example, the CTIS may be assembled without the sealing bushing and/or O-rings and with less tools. Additionally, stronger material for the wheel hub may reduce a weight of the assembly by reducing a size of the assembly while providing the desired mechanical resistance. In particular, because the assembly is configured without the bushing, an amount of space for the pneumatic channels may be increased, which may reduce a likelihood of undesired pressure drops.

Referring to FIG. 1, a portion of a vehicle 100 is schematically show including central tire inflation system (CTIS) 110. The CTIS 110 includes control unit 114. The control unit 114 comprises a pressure sensor 116 for measuring a pressure of air. In an embodiment, the control unit 114 also comprises a plurality of valve assemblies 118, 120, 122, 124, which may be of the solenoid variety, and a first control unit conduit 126 for controlling the flow of, and directing, air through the CTIS 110.

The control unit 114 may comprise a mechatronic control unit (MCU) or a pneumatic control unit (PCU), but is not limited thereto.

The control unit 114 also includes an electronic control portion 128 (which may be referred to herein as a controller and/or electronic controller). The electronic control portion 128 may receive input signals from the pressure sensor 116, a power supply 130, and one or more additional sensors (not depicted), such as, for example, a load sensor and a speed sensor. The electronic control portion 128 may also receive input signals from an operator control device 132. The electronic control portion 128 may include a microprocessor 134 operating under the control of a set of programming instructions, which may also be referred to as software. The electronic control portion 128 may include a memory 129 (e.g., non-transitory computer memory) in which programming instructions are stored. The memory 129 can also store identification codes, tire pressure records and/or user inputs over a period of time.

The electronic control portion 128 may output signals to the valve assemblies 118, 120, 122, 124 to open or close the valve assemblies 118, 120, 122, 124. The electronic control portion 128 may also output signals to a display device 133. The display device 133 may be included as a part of the operator control device 132 or may be included in a free-standing device.

The control unit 114 selectively communicates with an air supply 136 via an air supply circuit 138. The pressure sensor 116 measures the pressure of the air supply 136 via the air supply circuit 138 and the first control unit conduit 126. The control unit 114 may also comprise a control valve assembly 124. The control valve assembly 124 is provided with an orifice (not depicted) which is smaller than the orifice of the supply valve assembly 122 and is utilized to provide a blend of air from the air supply 136 to a fluid control circuit 140. In an embodiment, the supply valve assembly 122 and control valve assembly 124 are of the solenoid variety.

The air supply 136 is utilized to check the tire pressure and, if needed, increase and/or decrease the tire pressure. The air supply 136 comprises an air compressor 142 attached to the vehicle. In an embodiment, the air supply 136 also comprises a reservoir 144 such as, for example, a wet tank. The compressor 142 is in fluid communication with the reservoir 144 via a supply conduit 146. The air compressor 142 supplies pressurized air to the reservoir 144 for storage therein. Pressurized air from the air supply 136 is provided to the air supply circuit 138 via the reservoir 144. In certain embodiments, a drier 148 is provided for removing water from the air supply 136. A filter (not depicted) may also be interposed in the air supply circuit 138 or the supply conduit 146.

The control unit 114 is also selectively in fluid communication with the fluid control circuit 140. The fluid control circuit 140 is utilized to provide fluid communication between the control unit 114 and one or more tires 150, 152. In an embodiment, fluid communication between the control unit 114 and fluid control circuit 140 is controlled by opening or closing a channel of valve assembly 118.

Each tire 150, 152 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 114. If it is determined that the tire pressure is less than the target tire pressure, the tire pressure can be increased. If it is determined that the tire pressure is greater than the target tire pressure, the tire pressure can be decreased. The CTIS 110 will be described below with reference to the tire pressure of one tire, such as tire 150. However, the CTIS may at certain times be in fluid communication with a plurality of tires.

The tire inflation system 110 further comprises a plurality of rotating vehicle components including a first wheel hub 123, a second wheel hub 125, a third wheel hub 127, and a fourth wheel hub 131. The first wheel hub 123 is coupled to first tire 150, the second wheel hub 125 is coupled to second tire 152, the third wheel hub 127 is coupled to third tire 154, and the fourth wheel hub 131 is coupled to fourth tire 156. The wheel hubs are utilized to transfer pressurized air between portions of the CTIS 110. For example, each wheel hub may transfer pressurized air to the respective coupled tire (e.g., first wheel hub 123 may transfer pressurized air to the first tire 150, second wheel hub 125 may transfer pressurized air to the second tire 152, etc.). The wheel hubs described herein may be referred to as vehicle wheel hubs.

In the configuration shown by FIG. 1, the first wheel hub 123 is rotatably mounted (e.g., coupled) to a first stationary vehicle component 151, the second wheel hub 125 is rotatably mounted to a second stationary vehicle component 153, the third wheel hub 127 is rotatably mounted to a third stationary vehicle component 155, and the fourth wheel hub 131 is rotatably mounted to a fourth stationary vehicle component 157. The first stationary vehicle component 151 may support the first wheel hub 123 such that the first wheel hub 123 may rotate relative to the first stationary vehicle component 151 while the first stationary vehicle component 151 does not rotate relative to other portions of the vehicle (e.g., first stationary vehicle component 151 may be in a fixed position relative to a frame of the vehicle and does not rotate relative to the frame). The second stationary vehicle component 153 supports the second wheel hub 125 such that the second wheel hub 125 may rotate relative to the second stationary vehicle component 153. The third stationary vehicle component 155 supports the third wheel hub 127 such that the third wheel hub 127 may rotate relative to the third stationary vehicle component 155. The fourth stationary vehicle component 157 supports the fourth wheel hub 131 such that the fourth wheel hub may rotate relative to the fourth stationary vehicle component 157.

Each wheel hub may be driven by a corresponding axle of the vehicle. For example, the first wheel hub 123 and the second wheel hub 125 may each be driven by axle 180, and the third wheel hub 127 and the fourth wheel hub 131 may each be driven by axle 182. In some examples, the axle 180 may include two axle half shafts, with one of the half shafts configured to drive the first wheel hub 123 and with the other half shaft configured to drive the second wheel hub 125. In some examples, the axle 180 may include a differential configured to drive the half shafts forming the axle 180 independently of each other such that one axle half shaft may rotate at a speed that is different than a rotation speed of the other axle half shaft. The axle 182 may include a similar configuration, with one axle half shaft of the axle 182 driving the third wheel hub 127 and with the other axle half shaft of the axle 182 driving the fourth wheel hub 131.

In some examples, the axle 180 may be a rigid axle and the axle 182 may be a steering axle, or vice versa. For example, the axle 180 may be a rigid axle arranged at a rear portion of the vehicle, and the axle 182 may be a steering axle arranged at a front portion of the vehicle. The operator of the vehicle (e.g., a driver) may steer the vehicle via the axle 182 via a steering interface of the vehicle (e.g., by turning a steering wheel of the vehicle), where the axle 180 may not be connected to the steering interface.

The first stationary vehicle component 151 includes gas passage 160, the second stationary vehicle component 153 includes gas passage 162, the third stationary vehicle component 155 includes gas passage 164, and the fourth stationary vehicle component 157 includes gas passage 166. In some examples, the first stationary vehicle component 151, the second stationary vehicle component 153, the third stationary vehicle component 155, and the fourth stationary vehicle component 157 may be referred to collectively as a single stationary vehicle component. In some examples, the first stationary vehicle component 151 and the second stationary vehicle component 153 may be referred to collectively as a single stationary vehicle component, and the third stationary vehicle component 155 and the fourth stationary vehicle component 157 may be referred to collectively as a single stationary vehicle component. In some examples, each of the stationary vehicle components may be a respective axle arm of the vehicle.

The compressor 142 may be fluidly coupled to each of the gas passage 160, the gas passage 162, the gas passage 164, and the gas passage 166 and configured to flow pressurized gas to one or more of the gas passage 160, the gas passage 162, the gas passage 164, and the gas passage 166 responsive to operating conditions of the CTIS 110, vehicle operating conditions, commands input to the electronic control portion 128 by a vehicle operator, etc.

The gas passage 160 is fluidly coupled to a gas passage 170 within the first wheel hub 123, the gas passage 162 is fluidly coupled to a gas passage 172 within the second wheel hub 125, the gas passage 164 is fluidly coupled to a gas passage 174 within the third wheel hub 127, and the gas passage 166 is fluidly coupled to a gas passage 176 within the fourth wheel hub 131. Pressurized gas from the compressor 142 may flow from the gas passage 160 to the gas passage 170, from the gas passage 162 to the gas passage 172, from the gas passage 164 to the gas passage 174, and/or from the gas passage 166 to the gas passage 176. In some examples, the gas passage 160 and the gas passage 162 may be portions of a single gas passage extending through other components of the vehicle (e.g., axle 180). In some examples, the gas passage 164 and the gas passage 166 may be portions of a single gas passage extending through other components of the vehicle (e.g., axle 182). However, the gas passage 170 is arranged within the first wheel hub 123, the gas passage 172 is arranged within the second wheel hub 125, the gas passage 174 is arranged within the third wheel hub 127, and the gas passage 176 is arranged within the fourth wheel hub 131.

The gas passage 160 included within the first stationary vehicle component 151 may be referred to herein as a counterpart gas passage to the gas passage 170 arranged within the first wheel hub 123, the gas passage 162 included within the second stationary vehicle component 153 may be referred to herein as a counterpart gas passage to the gas passage 172 arranged within the second wheel hub 125, the gas passage 164 arranged within the third stationary vehicle component 155 may be referred to herein as a counterpart gas passage to the gas passage 174 arranged within the third wheel hub 127, and the gas passage 166 arranged within the fourth stationary vehicle component 157 may be referred to herein as a counterpart gas passage to the gas passage 176 arranged within the fourth wheel hub 131.

Each of the wheel hubs (e.g., first wheel hub 123, second wheel hub 125, third wheel hub 127, and fourth wheel hub 131) includes a respective sealing surface shaped to engage directly with a respective seal (e.g., the respective sealing surface engages in direct face-sharing contact with the respective seal, with no other components arranged between the respective sealing surface and the respective seal), where the seal is arranged between the wheel hub and the corresponding stationary vehicle component supporting the wheel hub. For example, the first wheel hub 123 includes a sealing surface shaped to engage directly with a seal arranged between the first wheel hub 123 and the first stationary vehicle component 151, the second wheel hub 125 includes a sealing surface shaped to engage directly with a seal arranged between the second wheel hub 125 and the second stationary vehicle component 153, the third wheel hub 127 includes a sealing surface shaped to engage directly with a seal arranged between the third wheel hub 127 and the third stationary vehicle component 155, and the fourth wheel hub 131 includes a sealing surface shaped to engage directly with a seal arranged between the fourth wheel hub 131 and the fourth stationary vehicle component 157. The seals described herein may be referred to as sealing members.

Each of the seals may form an interface between the respective wheel hub and the respective stationary vehicle component at the location of the respective gas passage disposed within the wheel hub. For example, the seal arranged between the first wheel hub 123 and the first stationary vehicle component 151 forms an interface between the first wheel hub 123 and the first stationary vehicle component 151 at the location at which the gas passage 170 fluidly couples (e.g., joins) to the gas passage 160. The seal arranged between the second wheel hub 125 and the second stationary vehicle component 153 forms an interface between the second wheel hub 125 and the second stationary vehicle component 153 at the location at which the gas passage 172 fluidly couples to the gas passage 162. The seal arranged between the third wheel hub 127 and the third stationary vehicle component 155 forms an interface between the third wheel hub 127 and the third stationary vehicle component 155 at the location at which the gas passage 174 fluidly couples to the gas passage 164. The seal arranged between the fourth wheel hub 131 and the fourth stationary vehicle component 157 forms an interface between the fourth wheel hub 131 and the fourth stationary vehicle component 157 at the location at which the gas passage 176 fluidly couples to the gas passage 166. In each of the examples described above, no other components are disposed between the sealing surface of a given wheel hub and the respective seal engaged directly with the sealing surface of the given wheel hub. For example, the seal at the first wheel hub 123 engages directly with the sealing surface of the first wheel hub 123 with no other components disposed between the seal and the sealing surface, the seal at the second wheel hub 125 engages directly with the sealing surface of the second wheel hub 125 with no other components disposed between the seal and the sealing surface, etc.

During conditions in which pressurized gas flows to a given wheel hub, the pressurized gas flows across the seal forming the interface between the given wheel hub and the respective stationary vehicle component supporting the given wheel hub. For example, during conditions in which pressurized gas flows from the gas passage 160 disposed within the first stationary vehicle component 151 to the gas passage 170 disposed within the first wheel hub 123, the pressurized gas flows across surfaces of the seal forming the interface between the first wheel hub 123 and the first stationary vehicle component 151 at the location at which the gas passage 170 fluidly couples to the gas passage 160. In this configuration, the interface between the given wheel hub and the respective stationary vehicle component is sealed by the seal, with the seal engaged directly against the sealing surface of the given wheel hub.

In some examples, as described below, the seal engaged with the sealing surface of a given wheel hub forms a sidewall of a chamber between the given wheel hub and the respective stationary vehicle component supporting the given wheel hub. The seal may border the location at which the respective gas passage disposed within the given wheel hub fluidly couples to the gas passage disposed within the respective stationary vehicle component supporting the given wheel hub. As one example, the seal forming the interface between the first wheel hub 123 and the first stationary vehicle component 151 may form a sidewall of a chamber between the first wheel hub 123 and the first stationary vehicle component 151 and may border the location at which the gas passage 170 disposed within the first wheel hub 123 fluidly couples to the gas passage 160 disposed within the first stationary vehicle component 151.

The respective sealing surface of each of the wheel hubs may be formed from a material configured to provide a fluid-impermeable interface with the corresponding seal during conditions in which the seal is seated directly against the sealing surface. In some examples, the sealing surface of each wheel hub may be formed from a steel material (e.g., stainless steel, induction hardened steel, etc.). In some examples, a surface finish of the sealing surface may be configured to provide the fluid-impermeable interface and/or increase the sealing of the seal against the sealing surface. For example, the surface finish may be a highly smooth surface finish (e.g., with an average roughness less than a pre-determined roughness, such as a roughness of 0.8 microns, where the pre-determined roughness may be selected to provide the desired sealing characteristic of the sealing surface). The configuration of the present disclosure provide sealing of the interface between a given wheel hub and the stationary vehicle component supporting the given wheel hub directly through engagement of the seal against the sealing surface formed by the given wheel hub, without additional components such as bushings to form the sealing surface. For example, the interface between the first wheel hub 123 and the first stationary vehicle component 151 may be sealed by engaging the respective seal against the sealing surface of the first wheel hub 123 without any other components arranged between the seal and the sealing surface, where the sealing surface is formed integrally with the first wheel hub 123 and is not formed by another component such as a bushing. Although the first wheel hub 123 is described by way of example, each other wheel hub (e.g., second wheel hub 125, third wheel hub 127, and fourth wheel hub 131) may include a similar configuration. By forming the sealing surface integrally with the given wheel hub, additional components such as bushings may be eliminated, which may reduce a cost of the CTIS (e.g., manufacturing cost, maintenance cost, etc.). Additionally, a maintenance frequency of the CTIS may be reduced, a complexity of assembly of the CTIS may be reduced, a weight of the CTIS may be reduced (and in particular, relative to a CTIS including wheel hubs formed from an iron material), and a likelihood of undesired flow of pressurized gas from the gas passages formed within the wheel hubs and/or the stationary vehicle components supporting the wheel hubs may be reduced.

The CTIS 110 shown by FIG. 1 is one example of a CTIS that may include one or more wheel hubs with respective integrated sealing surfaces according to the present disclosure. In some examples, the CTIS may include different components, a different relative arrangement of conduits, valve, and/or other components external to the wheel hubs, etc.

Figure 2:
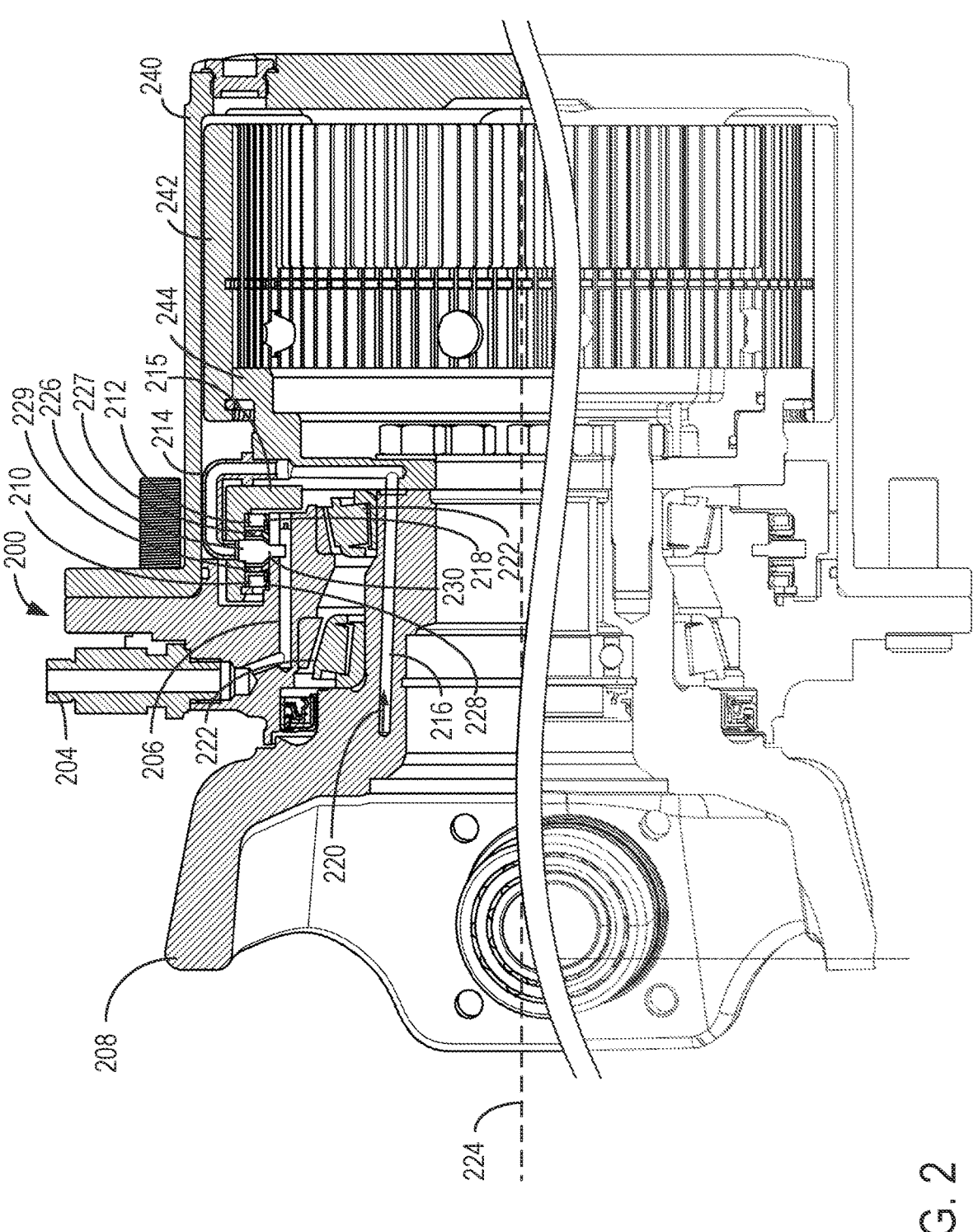
FIG. 2 shows a sectional view of a wheel hub with an integrated sealing surface.

Referring to FIG. 2, a sectional view of a wheel hub 200 including an integrated sealing surface 218 is shown. The wheel hub 200 shown by FIG. 2 may be similar to, or the same as, the wheel hubs described above with reference to FIG. 1. For example, the first wheel hub 123, the second wheel hub 125, the third wheel hub 127, and/or the fourth wheel hub 131 may be similar to, or the same as, the wheel hub 200 shown by FIG. 2. The wheel hub 200 may be included by a CTIS of a vehicle, such as the CTIS 110 of the vehicle described above with reference to FIG. 1. However, as described above, in some examples the CTIS may include different components and/or a different relative arrangement of components relative to the CTIS shown by FIG. 1.

The wheel hub 200 is configured to be rotatably coupled to a stationary vehicle component 208, similar to the examples described above with reference to FIG. 1. For example, the first stationary vehicle component 151, the second stationary vehicle component 153, the third stationary vehicle component 155, and/or the fourth stationary vehicle component 157 may be similar to, or the same as, the stationary vehicle component 208 shown by FIG. 2. In the example shown, the stationary vehicle component 208 is a steering knuckle or an axle arm. The position of the stationary vehicle component 208 is maintained relative to the wheel hub 200. In particular, during conditions in which the wheel hub 200 rotates, the stationary vehicle component 208 remains in a fixed position such that the wheel hub 200 rotates relative to the stationary vehicle component 208.

The wheel hub 200 is configured to couple to the stationary vehicle component 208 such that the wheel hub 200 may rotate relative to the stationary vehicle component 208. In the example shown by FIG. 2, the wheel hub 200 is rotatably coupled to (e.g., supported by) the stationary vehicle component 208 by bearings 222. However, in other examples, the wheel hub may be rotatably coupled to the stationary vehicle component by a different component.

The wheel hub 200 is configured to rotate around rotational axis 224. In some examples, the rotational axis 224 is arranged parallel to and/or coaxial with a rotational axis of an axle configured to drive the rotation of the wheel hub 200. The axle may be similar to, or the same as, axle 180 and/or axle 182 shown by FIG. 1 and described above.

The stationary vehicle component 208 includes a gas passage 216 formed therein, where the gas passage 216 is fluidly coupled to a compressor configured to deliver pressurized gases (e.g., pressurized air) to the gas passage 216. The compressor may be similar to, or the same as, the compressor 142 described above with reference to FIG. 1. A direction of air flow from the compressor through the gas passage 216 is indicated by arrow 220. The gas passage 216 may extend through the stationary vehicle component 208 toward the compressor in a direction normal to the plane of view of FIG. 2.

The wheel hub 200 includes a gas passage 206 formed integrally with the wheel hub 200. For example, the gas passage 206 may be formed with the remaining portions of the wheel hub 200 as a single unit (e.g., molded together with the other portions of the wheel hub 200 and from a same material as the other portions of the wheel hub 200). In some examples, the gas passage 206 may be machined into the wheel hub 200 (e.g., drilled into the wheel hub 200). The gas passage 206 of the wheel hub 200 is fluidly coupled to the gas passage 216 of the stationary vehicle component 208. The gas passage 216 may be referred to herein as a counterpart gas passage to the gas passage 206. In the example shown, the gas passage 206 fluidly couples to the gas passage 216 at chamber 226. The gas passage 206 may extend approximately parallel with the gas passage 216, in some examples. Configuring the gas passage 206 to extend approximately parallel with the gas passage 216 may result in a reduced space occupied by the gas passage 206 and the gas passage 216, which may reduce a size of the wheel hub 200 and/or stationary vehicle component 208.

In the example shown by FIG. 2, the gas passage 216 includes an angled connector 214 supported by a support 215. The angled connector 214 extends around the wheel hub 200 and fluidly couples to the gas passage 206 formed within the wheel hub 200. In some examples, the angled connector 214 may be a separate component from each of the wheel hub 200 and the stationary vehicle component 208 and the angled connector 214 is connected (e.g., coupled) to the stationary vehicle component 208. The angled connector 214 may reduce a likelihood of undesired gas pressure changes within the gas passages (e.g., gas passage 216, gas passage 206, etc.).

The gas passage 206 formed within the wheel hub 200 is fluidly coupled to a gas outlet 204, where the gas outlet 204 is configured to flow pressurized gases from the gas passage 206 to a tire coupled to the wheel hub 200. The tire may be similar to, or the same as, tire 150, tire 152, tire 154, and or tire 156 shown by FIG. 1 and described above. As one example, during conditions in which a pressure of gases within the tire is below a threshold amount, a controller of the CTIS including the wheel hub 200 may command pressurized air to flow from the compressor to the gas passage 216, from the gas passage 216 to the gas passage 206, and from the gas passage 206 to the gas outlet 204. The controller may be similar to, or the same as, the electronic control portion 128 shown by FIG. 1 and described above. The CTIS may be similar to, or the same as, the CTIS 110 shown by FIG. 1 and described above. However, as described above, in some examples the CTIS may include different components and/or a different relative arrangement of components relative to the CTIS shown by FIG. 1.

The wheel hub 200 includes sealing surface 218, which may be referred to herein as a first sealing surface. The wheel hub 200 additionally includes a second sealing surface 228 spaced apart from the first sealing surface 218 by an opening 230 of the chamber 226. In some examples, the first sealing surface 218 and the second sealing surface 228 may be a single surface including the opening 230. In some examples, the opening 230 may be an annular opening extending around a perimeter of the first sealing surface 218 and the second sealing surface 228. A width of the chamber 226 in a direction parallel with the rotational axis 224 may be larger than a width of the opening 230 in the direction parallel with the rotational axis 224.

The first sealing surface 218 and the second sealing surface 228 are each configured to engage directly with a sealing member configured to form a sealed interface between the wheel hub 200 and the stationary vehicle component 208. For example, the first sealing surface 218 is shaped to engage directly with sealing member 212, and the second sealing surface 228 is shaped to engage directly with sealing member 210. Sealing member 212 and sealing member 210 may each be referred to herein as seals. In some examples, the sealing member 210 and sealing member 212 may be a single sealing member. Sealing member 210 and sealing member 212 may each include one or more respective sealing lips providing sealing of the chamber 226. The sealing member 210 and the sealing member 212 may be formed from a material configured to provide a fluid-impermeable seal between the wheel hub 200 and the stationary vehicle component 208. As one example, the material of the sealing member 210 and the sealing member 212 may be a rubber material, a polymer material, etc. As described above, the gas passage 216 and the gas passage 206 are fluidly coupled to each other at chamber 226 forming the opening 230. The sealing member 212 may form a first sidewall 227 of chamber 226 disposed between the gas passage 216 and the gas passage 206 at the location at which the gas passage 216 fluidly couples to the gas passage 206. The sealing member 210 may form a second sidewall 229 of the chamber 226, opposite to the first sidewall 226, across the opening 230. The sealing member 212 is arranged at a first end 300 of the chamber 226 (e.g., at a first end of the opening 230), and the sealing member 210 is arranged at an opposing, second end 302 of the chamber 226 (e.g., at an opposing, second end of the opening 230), where the first end 300 and the second end 302 are each indicated in FIG. 3, such that the sealing member 212 borders the chamber 226 at the first end 300 and the sealing member 210 borders the chamber 226 at the second end 302. In this configuration, fluid (e.g., gases, such as air) may flow from the gas passage 216 to the gas passage 206 at the chamber 226 but may not flow from the chamber 226 to other portions of the wheel hub 200, the stationary vehicle component 208, or atmosphere due to this sealing interface between the wheel hub 200 and the stationary vehicle component 208 provided by the sealing member 212 and the sealing member 210.

As described above, the sealing surface 218 and the sealing surface 228 are formed integrally with the wheel hub 200. In particular, the sealing surface 218 and the sealing surface 228 are formed together (e.g., molded together) with the other portions of the wheel hub 200 such that the wheel hub 200 is a single, monolithic unit including the sealing surface 218 and the sealing surface 228. The wheel hub 200, including the sealing surface 218 and the sealing surface 228, may be formed of a material selected to provide the desired sealing of seal 212 against the sealing surface 218 and the sealing of the sealing member 210 against the sealing surface 228. As one example, the wheel hub 200, including the sealing surface 218 and the sealing surface 228, may be formed from a steel material (e.g., stainless steel, induction hardened steel etc.).

A surface finish of the sealing surface 218 and the sealing surface 228 may be configured to increase the sealing of the sealing surfaces against the respective seals. For example, the surface finish of the sealing surface 218 may be sufficiently smooth to provide a fluid-impermeable seal against the seal 212 without additional bushings or other components, and the surface finish of the sealing surface 228 may be sufficiently smooth to provide a fluid-impermeable seal against the sealing member 210 without additional bushings or other components.

As a result of the configuration of the sealing surface 218 and the sealing surface 228 described above, the sealing of the interface between the wheel hub 200 and the stationary vehicle component 208 may be realized with reduced cost and/or weight, as described above in the example of first wheel hub 123 shown by FIG. 1.

Figure 3:
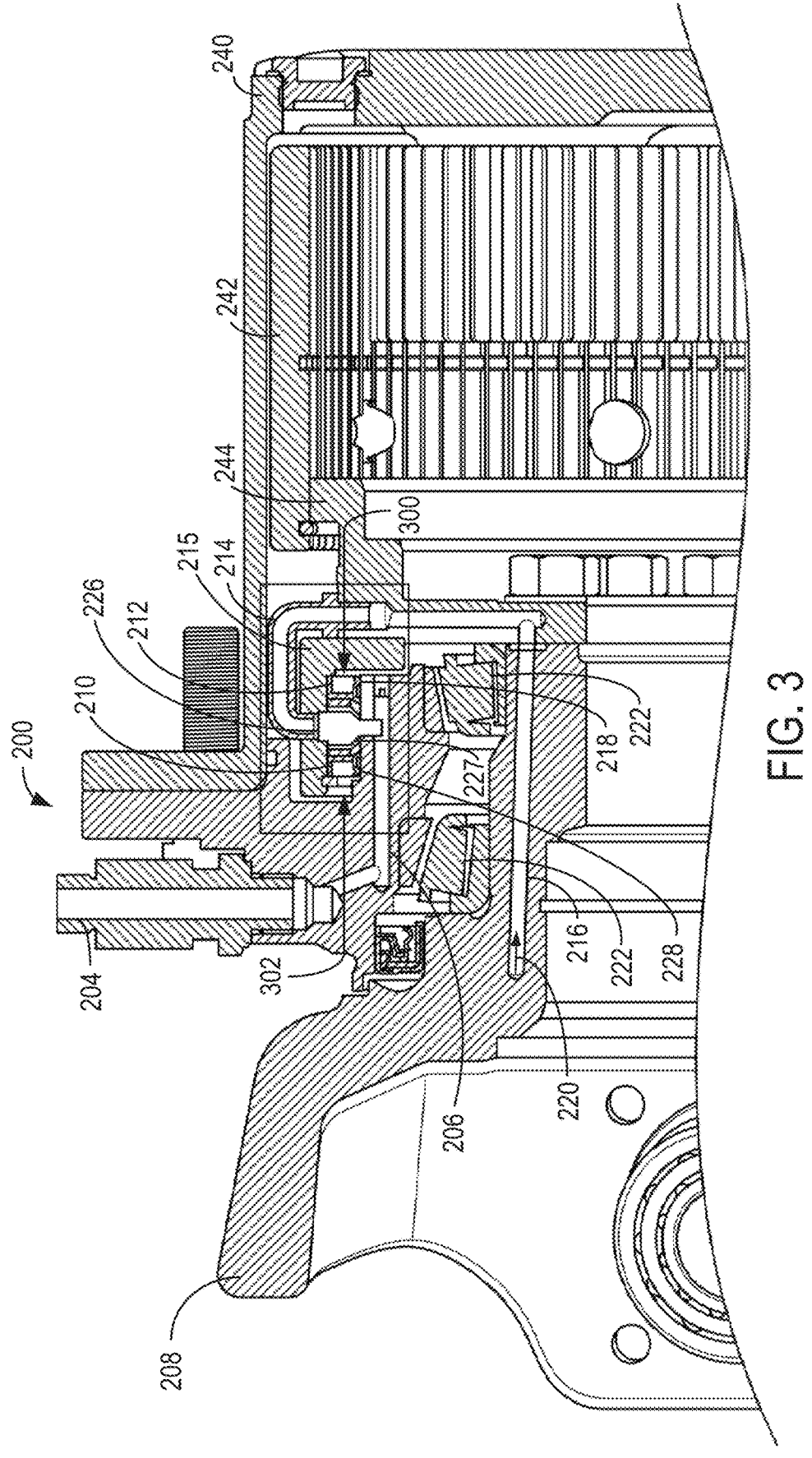
FIG. 3 shows an enlarged sectional view of the wheel hub of FIG. 2.
Figure 3A:
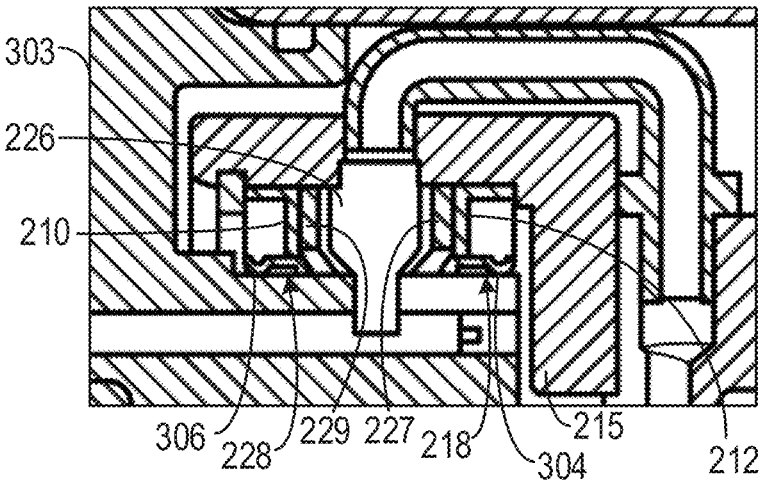
FIG. 3A shows a detailed view of an inset.

Referring to FIG. 3, an enlarged sectional view of the wheel hub 200 is shown. FIG. 3A includes inset 303 showing a further enlarged view of the portion of the wheel hub 200 including the sealing surface 218 and the sealing surface 228. As shown by the inset 303, the sealing member 212 includes a lip 304, and the sealing member 210 includes a lip 306. During conditions in which the sealing member 212 is engaged directly against (e.g., seated in direct face-sharing contact against) the sealing surface 218, the lip 304 of the sealing member 212 may compress against the sealing surface 218 and may increase the sealing of the sealing member 212 against the sealing surface 218. Similarly, during conditions in which the sealing member 210 is engaged directly against the sealing surface 228, the lip 306 of the sealing member 210 may compress against the sealing surface 228 and may increase the sealing of the sealing member 210 against the sealing surface 228. Although in the example shown the sealing member 212 includes the lip 304 and the sealing member 210 includes the lip 306, in some examples the sealing members may not include lips and may be configured to seal directly against the corresponding sealing surfaces without the lips.

In the example shown, a gear portion 242 of an epicycle drivetrain is coupled to the stationary vehicle component 208 at an extended portion 244 of the stationary vehicle component 208. The gear portion 242 is arranged within a housing 240. In some examples (e.g., configurations in which the vehicle is a 4-wheel drive vehicle), the housing 240 may be a planetary carrier. In other examples (e.g., configurations in which the vehicle is adjustable between a 2-wheel drive mode and a 4-wheel drive mode), the housing may be a cover of a planetary gear assembly. In some examples, the extended portion 244 may be integrated with the gear portion 242 (e.g., formed together with the gear portion 242).

Figure 4:
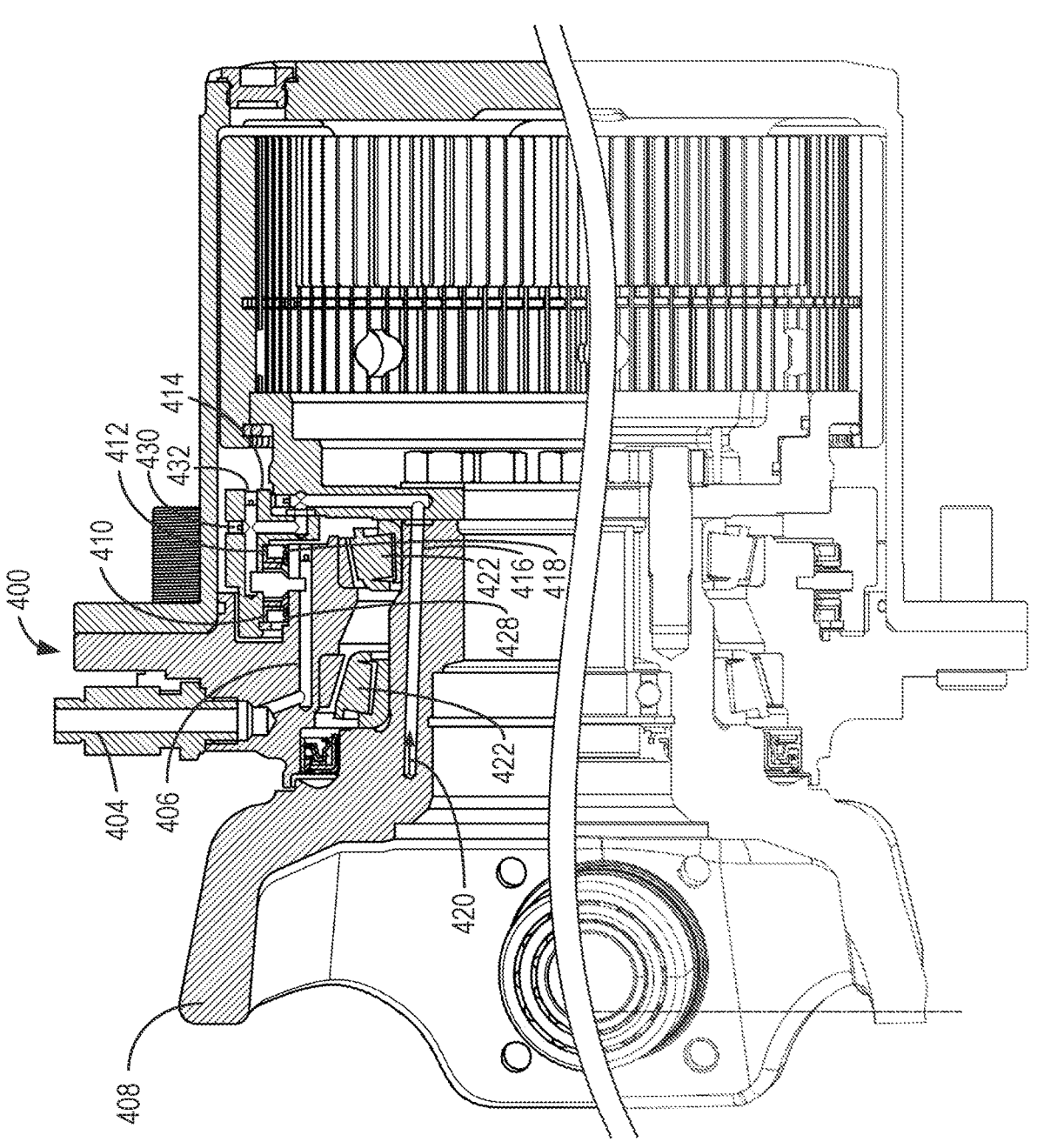
FIG. 4 shows a sectional view of another wheel hub with an integrated sealing surface.

Referring to FIG. 4, a sectional view of another wheel hub 400 including integrated sealing surfaces is shown. FIG. 5 additionally shows an enlarged view of a portion of the wheel hub 400. Several of the components shown by FIGS. 4-5 are similar to, or the same as, components shown by FIGS. 2-3. For example, FIGS. 4-5 show stationary vehicle component 408, gas passage 416 formed within the stationary vehicle component 408, gas passage 406 formed within wheel hub 400, gas outlet 404, sealing member 412 engaged directly with sealing surface 418, sealing member 410 engaged directly with sealing surface 428, and bearing 422, which may be similar to, or the same as, stationary vehicle component 208, gas passage 216 formed within the stationary vehicle component 208, gas passage 206 formed within the wheel hub 200, gas outlet 204, sealing member 212 engaged directly with sealing surface 218, sealing member 210 engaged directly with sealing surface 228, and bearing 222, respectively, described above with reference to FIGS. 2-3. Sealing member 412 and sealing member 410 may each be referred to herein as seals.

The first wheel hub 123, the second wheel hub 125, the third wheel hub 127, and/or the fourth wheel hub 131 shown by FIG. 1 and described above may be similar to, or the same as, the wheel hub 400 shown by FIGS. 4-5. The wheel hub 400 may be included by a CTIS of a vehicle, such as the CTIS 110 of the vehicle described above with reference to FIG. 1.

The gas passage 406 may receive pressurized gases (e.g., pressurized air) from a compressor, such as the compressor 142 shown by FIG. 1 and described above. The pressurized gases may flow in the direction indicated by arrow 420. In the example shown by FIG. 4, the gas passage 416 includes a connector 414, where the connector 414 has machined (e.g., drilled) gas passages capped by plugs. In particular, the connector 414 is sealed by first plug 430 and second plug 432. By including the connector 414, a number of components coupling the wheel hub 400 to the stationary vehicle component 408 may be reduced.

Referring to FIG. 6, a sectional view of another wheel hub 600 including an integrated sealing surface is shown. The first wheel hub 123, the second wheel hub 125, the third wheel hub 127, and/or the fourth wheel hub 131 shown by FIG. 1 and described above may be similar to, or the same as, the wheel hub 600 shown by FIG. 6. The wheel hub 600 may be included by a CTIS of a vehicle, such as the CTIS 110 of the vehicle described above with reference to FIG. 1.

FIG. 6 shows gas outlet 602, sealing member 606, sealing member 608, stationary vehicle component 604, gas passage 610, housing 612, adapter 614 (which may be a separate component, or integrated with stationary vehicle component 604, or integrated with sealing member 606), gas passage 616, double joint 618, bearing 620, sealing surface 611, sealing surface 613, and spindle 624. Sealing member 606 and/or sealing member 608 may be referred to herein as a seal. In the configuration shown by FIG. 6, each of the sealing member 606 and the sealing member 608 is arranged to be in direct contact with lubricant (e.g. oil) at one side, with the sealing member 606 and the sealing member 608 providing sealing such that the lubricant does not flow to the gas passage 610 or the gas passage 616.

Figure 7:
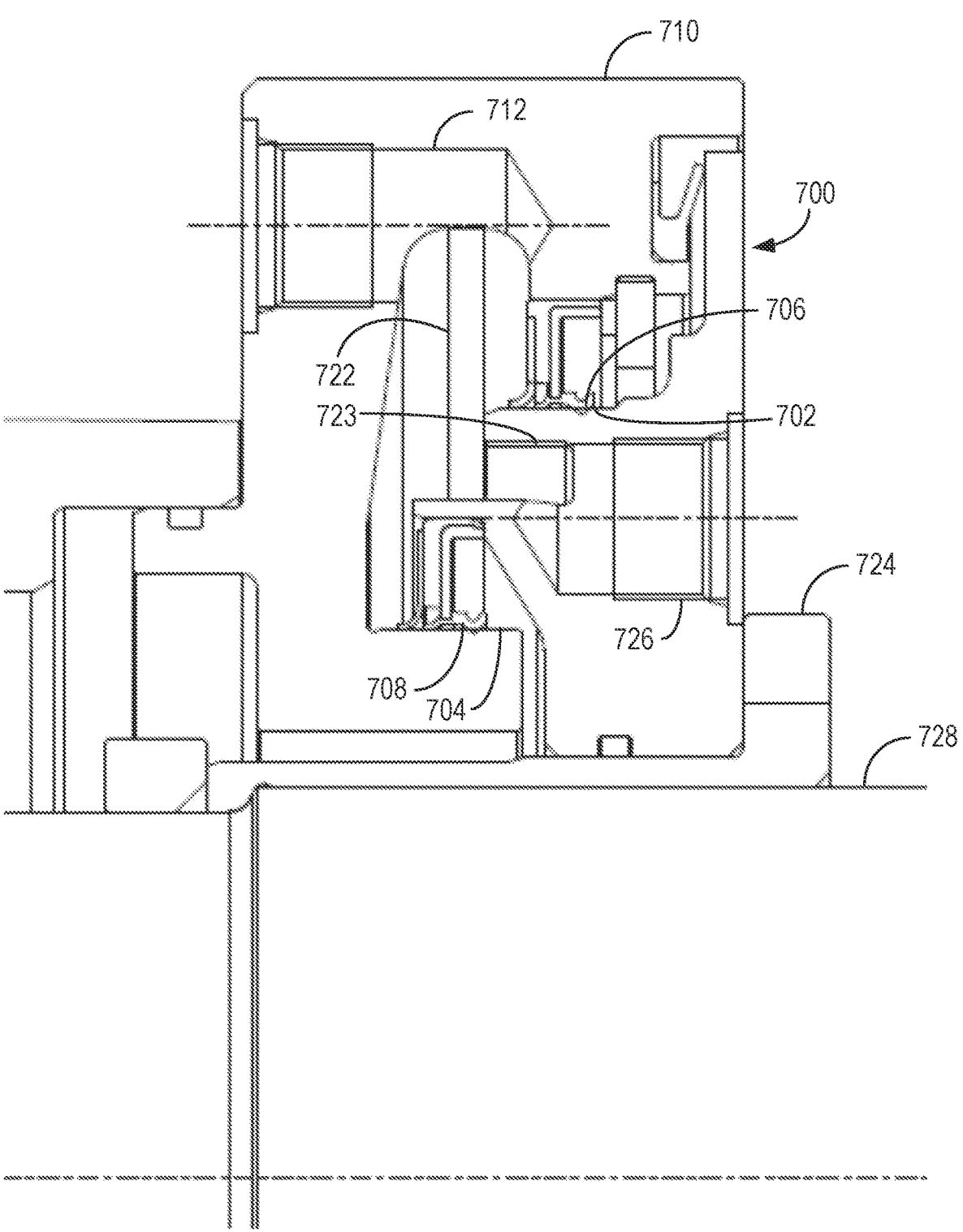
FIG. 7 shows a sectional view of another wheel hub including an integrated sealing surface.
Figure 8:
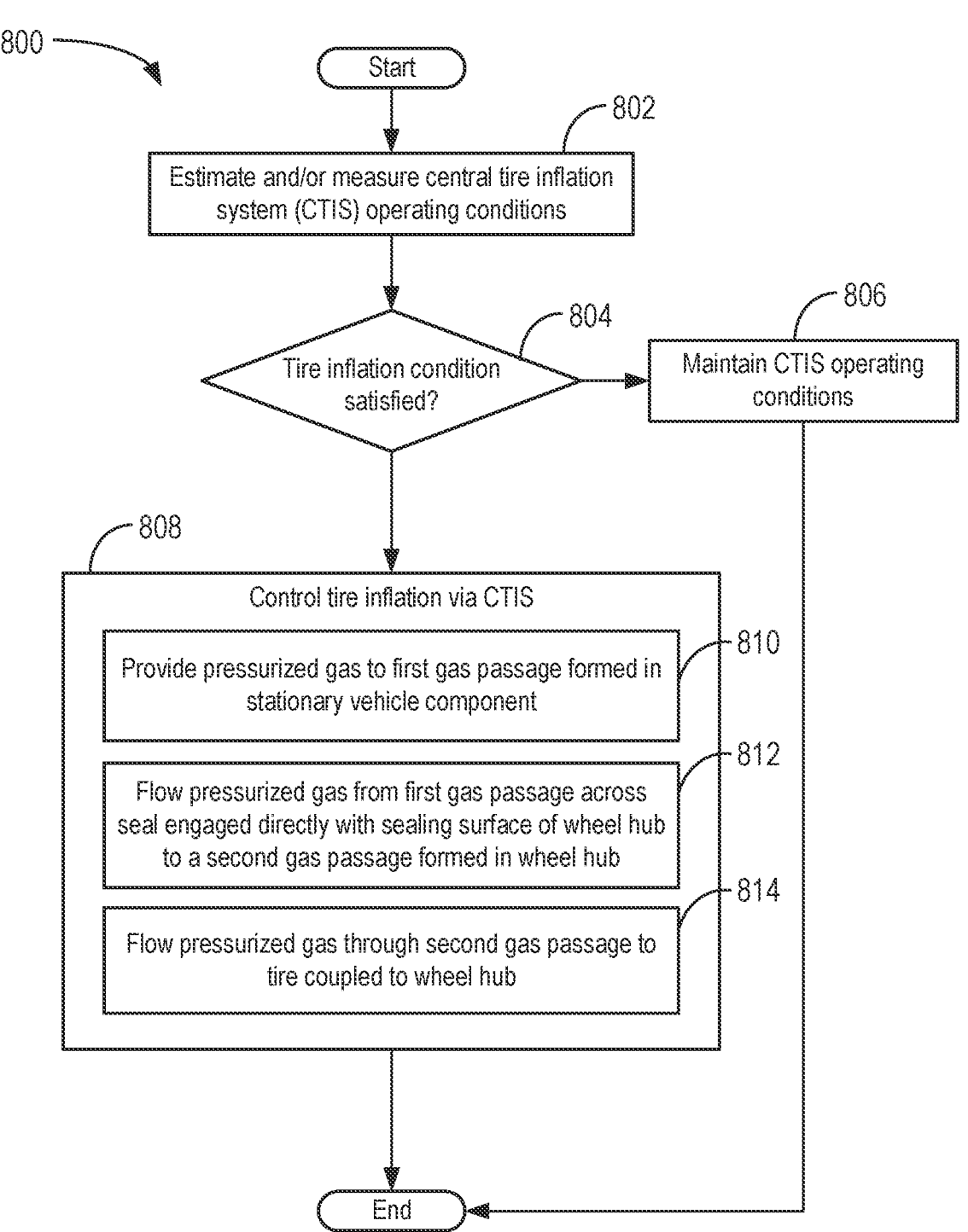
FIG. 8 shows a flowchart illustrating a method for flowing gas through a wheel hub including an integrated sealing surface.

Referring to FIG. 7, a sectional view of another wheel hub 700 including an integrated sealing surface is shown. The first wheel hub 123, the second wheel hub 125, the third wheel hub 127, and/or the fourth wheel hub 131 shown by FIG. 1 and described above may be similar to, or the same as, the wheel hub 700 shown by FIG. 7. The wheel hub may be included by a CTIS of a vehicle, such as the CTIS 110 of the vehicle described above with reference to FIG. 1.

The wheel hub 700 includes a sealing surface 702 shaped to engage directly with sealing member 706, and a sealing surface 704 shaped to engage directly with a sealing member 708. FIG. 7 additionally shows stationary vehicle component 710, gas passage 723, gas inlet 712, gas passage 722, extended portion 724, gas outlet 726, and shaft 728. Shaft 728 may be coupled to a tire rim, in some examples, and in some examples the shaft 728 may be integrated together with the extended portion 724.

Referring to FIG. 8, a flowchart illustrating a method 800 for flowing gas through a wheel hub including an integrated sealing surface is shown. The wheel hub may be similar to, or the same as, the wheel hub 200 shown by FIGS. 2-3, the wheel hub 400 shown by FIGS. 4-5, the wheel hub 600 shown by FIG. 6, and/or the wheel hub 700 shown by FIG. 7, as described above. Instructions for carrying out method 800 and the rest of the methods included herein may be executed by a controller based on instructions stored on a memory (e.g., non-transitory computer memory) of the controller and in conjunction with signals received from sensors of a central tire inflation system (CTIS), such as the sensors described above with reference to FIG. 1. The controller may employ actuators of the CTIS to adjust CTIS operation, according to the methods described below. The controller may be similar to, or the same as, the electronic control portion 128 shown by FIG. 1 and described above. The wheel hub may be included within a vehicle, such as the vehicle described above with reference to FIG. 1. However, as described above, in some examples the CTIS may include different components and/or a different relative arrangement of components relative to the CTIS shown by FIG. 1.

The method at 802 includes estimating and/or measuring central tire inflation system (CTIS) operating conditions. Estimating and/or measuring CTIS operating conditions may include, for example, determining a gas pressure within one or more tires of the vehicle (e.g., tire 150, tire 152, etc. shown by FIG. 1) based on signals output by one or more pressure sensors (e.g., pressure sensor 116 described above with reference to FIG. 1), determining a vehicle speed based on one or more vehicle speed sensors, determining a vehicle load based on one or more vehicle load sensors, determining an amount of opening of one or more valve assemblies (e.g., valve assemblies 118, 120, 122, and/or 124 described above with reference to FIG. 1), etc.

The method continues from 802 to 804 where the method includes determining whether a tire inflation condition has been satisfied. The tire inflation condition may be a condition in which the controller determines that inflation of one or more tires is desired. For example, during conditions in which the vehicle is operated (e.g., driven) along a smooth surface (e.g., a paved road), the controller may determine that increasing a pressure of gases within the one or more tires may increase a fuel economy of the vehicle (e.g., by decreasing resistance applied to the tires), increase vehicle handling, etc. As a result, the controller may determine that the tire inflation condition has been satisfied. As another example, during conditions in which a pressure of gases within the tires decreases below a threshold pressure, the controller may determine that inflation of one or more of the tires may increase vehicle performance (e.g., handling, etc.). As a result, the controller may determine that the tire inflation condition has been satisfied. In some examples, the threshold pressure may be based on vehicle operating conditions such as a speed of the vehicle, a terrain on which the vehicle is driven, ambient temperature, etc.

If the tire inflation condition has not been satisfied at 804, the method continues from 804 to 806 where the method includes maintaining CTIS operating conditions. Maintaining the CTIS operating conditions may include not adjusting the pressure of gases within the tires of the vehicle (e.g., maintaining the pressure of the gases within the tires). For example, because the tire inflation condition has not been satisfied, the controller may determine that maintaining the pressure of gases within the tires provides sufficient vehicle performance based on the vehicle operating conditions. As a result, the pressure of the gases within the tires is not adjusted.

However, if the tire inflation condition is satisfied at 804, the method continues from 804 to 808 where the method includes controlling tire inflation via the CTIS. Controlling the tire inflation via the CTIS includes adjusting the pressure of gases within one or more of the tires of the vehicle by providing pressurized gas to the one or more tires. For example, the controller may command energization of a compressor of the vehicle (e.g., air compressor 142 described above with reference to FIG. 1) to pressurize air for delivery to the one or more tires. In some examples, the compressor may be driven by an engine of the vehicle, and in other examples the compressor may be electrically driven (e.g., powered by an energy storage device of the vehicle, such as a battery). In examples in which the compressor is driven by the engine, the vehicle may include one or more clutches or other components configured to selectably couple and/or decouple the compressor from the engine responsive to commands provided to the clutches or other components by the controller. For example, during conditions in which compression of air by the compressor is desired, the controller may command a clutch or other component to engage the compressor with the engine such that the compressor is driven by the engine, and during conditions in which compressor of air by the compressor is not desired, the controller may command the clutch or other component to disengage the compressor from the engine such that the compressor is not driven by the engine. In some examples, the controller may control an amount of opening of a wastegate arranged downstream from the compressor and within a pathway of pressurized air output by the compressor to vent a portion of air compressed by the compressor to atmosphere. In some examples, the controller may control an amount of opening of a bypass valve arranged upstream to the compressor to control the amount of air flowing to the compressor for compression by the compressor.

Controlling the tire inflation via the CTIS at 808 includes, at 810, providing pressurized gas to a first gas passage formed in a stationary vehicle component. The stationary vehicle component with first gas passage may be similar to, or the same as, the stationary vehicle component 151 with gas passage 160, stationary vehicle component 153 with gas passage 162, stationary vehicle component 155 with gas passage 164, and/or stationary vehicle component 157 with gas passage 166 shown by FIG. 1 and described above, stationary vehicle component 208 with gas passage 216 shown by FIGS. 2-3 and described above, stationary vehicle component 408 with gas passage 416 shown by FIGS. 4-5 and described above, stationary vehicle component 604 with gas passage 616 shown by FIG. 6 and described above, and/or stationary vehicle component 710 with gas passage 722 shown by FIG. 7 and described above.

The pressurized gas may be provided to the first gas passage by the compressor, where the first gas passage is fluidly coupled to the compressor. For example, the controller may adjust an amount of opening of a valve assembly fluidly coupling the first gas passage to the compressor to flow pressurized gas from the compressor to the first gas passage. As one example, the valve assembly may be similar to, or the same as, the valve assemblies 118 described above with reference to FIG. 1.

Controlling the tire inflation via the CTIS at 808 includes, at 812, flowing pressurized gas from the first gas passage across a seal engaged directly with the sealing surface of the wheel hub to a second gas passage formed in the wheel hub. The second gas passage, seal, and sealing surface may be similar to, or the same as, the gas passage 206, sealing member 212, and sealing surface 218, respectively, shown by FIGS. 2-3 and described above, the gas passage 406, sealing member 412, and sealing surface 418, respectively, shown by FIGS. 4-5 and described above, the gas passage 610, seal 606, and sealing surface 611, respectively, shown by FIG. 6 and described above, and/or the gas passage 723, seal 708, and sealing surface 704, respectively, shown by FIG. 7 and described above. The pressurized gas flows from the first gas passage and may flow directly along surfaces of the seal from the first gas passage to the second gas passage, while the engagement of the seal directly against the sealing surface seals the flow of gas from flowing through the interface of the seal against the sealing surface.

Controlling the tire inflation via the CTIS at 808 includes, at 814, flowing the pressurized gas through the second gas passage to a tire coupled to the wheel hub. Flowing the pressurized gas from the second gas passage to the tire may include flowing the gas to a gas outlet fluidly coupled to the second gas passage. The second gas passage and gas outlet may be similar to, or the same as, the gas passage 206 and gas outlet 204, respectively, shown by FIGS. 2-3 and described above, the gas passage 406 and gas outlet 404, respectively, shown by FIGS. 4-5 and described above, the gas passage 610 and gas outlet 602, respectively, shown by FIG. 6 and described above, and/or the gas passage 723 and gas outlet 726, respectively, shown by FIG. 7 and described above. The tire may be similar to, or the same as, the tire 150, tire 152, tire 154, and/or tire 156 shown by FIG. 1 and described above.

In some examples, controlling the tire inflation via the CTIS may include flowing gas out of the tire via the gas passages to lower the gas pressure within the tire. Flowing gas out of the tire may include flowing gas across the surfaces of the seal described above.

In this way, by configuring the wheel hub to include the integrated sealing surface shaped to engage directly with the seal forming the interface between the wheel hub and the stationary vehicle component supporting the wheel hub, the sealing of the gas pathway through the stationary vehicle component, through the wheel hub, and to the tire may be realized without additional components such as bushings to provide the sealed interface. As a result, a manufacturing cost and/or maintenance cost of the CTIS may be reduced. Further, by forming the sealed interface without additional components such as bushings, a packaging space of the CTIS may be reduced, which may reduce vehicle weight and increase vehicle performance.

FIGS. 2-7 are shown to scale, although other relative dimensions may be used, if desired.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

The disclosure also provides support for a system, comprising: a vehicle wheel hub or rotating vehicle component including a gas passage and a sealing surface shaped to engage directly with a seal to fluidly couple the gas passage to a counterpart gas passage of a stationary vehicle component. In a first example of the system, the sealing surface and the gas passage are integrally formed with the vehicle wheel hub or rotating vehicle component as a single unit. In a second example of the system, optionally including the first example, the sealing surface is shaped to engage directly with the seal with no other components disposed between the sealing surface and the seal. In a third example of the system, optionally including one or both of the first and second examples, the vehicle wheel hub or rotating vehicle component is supported by the stationary vehicle component. In a fourth example of the system, optionally including one or more or each of the first through third examples, the stationary vehicle component is a steering knuckle or an axle arm. In a fifth example of the system, optionally including one or more or each of the first through fourth examples, the gas passage joins to the counterpart gas passage via a chamber between the vehicle wheel hub or rotating vehicle component and the stationary vehicle component bordered at a first end by the seal. In a sixth example of the system, optionally including one or more or each of the first through fifth examples, the sealing surface is a first sealing surface and the seal is a first seal, and the vehicle wheel hub or rotating vehicle component includes a second sealing surface shaped to engage directly with a second seal. In a seventh example of the system, optionally including one or more or each of the first through sixth examples, the second sealing surface is arranged across an opening of the gas passage from the first sealing surface. In a eighth example of the system, optionally including one or more or each of the first through seventh examples, the gas passage joins to the counterpart gas passage via a chamber between the vehicle wheel hub or rotating vehicle component and the stationary vehicle component bordered at a first end by the first seal and bordered at an opposing, second end by the second seal. In a ninth example of the system, optionally including one or more or each of the first through eighth examples, a surface finish of the sealing surface of the vehicle wheel hub forms a fluid-impermeable interface with the seal while the seal is engaged directly with the sealing surface. In a tenth example of the system, optionally including one or more or each of the first through ninth examples, the vehicle wheel hub or rotating vehicle component is formed from a steel material or from a first material with a hardness at least equal to a hardness of steel, and where an average roughness of the steel material or the first material is less than a predetermined roughness to provide sealing of the vehicle wheel hub or rotating vehicle component against the seal.

The disclosure also provides support for a central tire inflation system (CTIS), comprising: a stationary vehicle component including a first gas passage, a wheel hub rotatably coupled to the stationary vehicle component and including a second gas passage and a sealing surface, and a sealing member engaged directly with the sealing surface and fluidly coupling the first gas passage with the second gas passage. In a first example of the system, the sealing member forms a sidewall of a chamber joining the first gas passage to the second gas passage. In a second example of the system, optionally including the first example, the system further comprises: a compressor fluidly coupled to the first gas passage and configured to flow pressurized gas to the second gas passage from the first gas passage. In a third example of the system, optionally including one or both of the first and second examples, the system further comprises: an electronic controller including instructions stored in non-transitory memory that when executed, cause the electronic controller to: flow gas across the sealing member engaged directly with the sealing surface of the wheel hub from the first gas passage formed to the second gas passage. In a fourth example of the system, optionally including one or more or each of the first through third examples, the sealing member includes a lip shaped to seat in direct face-sharing contact with the sealing surface of the wheel hub with no other components arranged between the lip and the sealing surface. In a fifth example of the system, optionally including one or more or each of the first through fourth examples, a first end of the second gas passage is arranged at the first gas passage and a second end of the second gas passage is arranged at an outlet fluidly coupled to a tire coupled to the wheel hub.

The disclosure also provides support for a method, comprising: flowing gas across a seal engaged directly with a sealing surface of a wheel hub from a first gas passage formed in a stationary vehicle component to a second gas passage formed in the wheel hub. In a first example of the method, flowing the gas across the seal includes flowing the gas through a chamber formed between the first gas passage and the second gas passage and bordered by the seal. In a second example of the method, optionally including the first example, the method further comprises: flowing the gas from the second gas passage to a tire coupled to the wheel hub.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a vehicle wheel hub or rotating vehicle component including a gas passage and a sealing surface shaped to engage directly with a seal to fluidly couple the gas passage to a counterpart gas passage of a stationary vehicle component, wherein the gas passage comprises an angled connector configured to reverse gas flow from a first direction entering the angled connector to a second direction exiting the angled connector toward the counterpart gas passage, and wherein the sealing surface and the gas passage are integrally formed with the vehicle wheel hub or rotating vehicle component, and wherein the angled connector comprises a 180 degree, U-shaped bend.

2. The system of claim 1, wherein the sealing surface is shaped to engage directly with the seal with no other components disposed between the sealing surface and the seal.

3. The system of claim 1, wherein the vehicle wheel hub or rotating vehicle component is supported by the stationary vehicle component, and wherein the angled connector is supported by a support arranged adjacent to a sealing member.

4. The system of claim 1, wherein the stationary vehicle component is a steering knuckle or an axle arm.

5. The system of claim 1, wherein a chamber is configured to join the gas passage to the counterpart gas passage, and wherein the chamber is between the vehicle wheel hub or rotating vehicle component and the stationary vehicle component bordered at a first end by the seal.

6. The system of claim 1, wherein the sealing surface is a first sealing surface and the seal is a first seal, and the vehicle wheel hub or rotating vehicle component includes a second sealing surface shaped to engage directly with a second seal.

7. The system of claim 6, wherein the second sealing surface is arranged on an opposite end of an opening of the gas passage from the first sealing surface.

8. The system of claim 6, wherein a chamber is configured to join the gas passage to the counterpart gas passage.

9. The system of claim 1, wherein a surface finish of the sealing surface of the vehicle wheel hub forms a fluid-impermeable interface with the seal while the seal is engaged directly with the sealing surface.

10. The system of claim 1, wherein the vehicle wheel hub or rotating vehicle component is formed from a steel material or from a first material with a hardness at least equal to a hardness of steel, and where an average roughness of the steel material or the first material is less than a pre-determined roughness to provide sealing of the vehicle wheel hub or rotating vehicle component against the seal.

11. A central tire inflation system (CTIS), comprising:
a stationary vehicle component including a first gas passage comprising an angled connector configured to reverse gas flow from a first direction entering the angled connector to a second direction exiting the angled connector;
a wheel hub rotatably coupled to the stationary vehicle component and including a second gas passage and a sealing surface; and
a sealing member engaged directly with the sealing surface and fluidly coupling the first gas passage with the second gas passage, wherein the sealing member forms a sidewall of a chamber joining the first gas passage to the second gas passage, wherein the angled connector extends from the first gas passage to the chamber, and wherein the first gas passage is linear and the angled connector is U-shaped and configured to direct the gas flow in the second direction toward the second gas passage.

12. The CTIS of claim 11, further comprising a compressor fluidly coupled to the first gas passage and configured to flow pressurized gas to the second gas passage from the first gas passage.

13. The CTIS of claim 11, further comprising an electronic controller including instructions stored in non-transitory memory that when executed, cause the electronic controller to:
flow gas across the sealing member engaged directly with the sealing surface of the wheel hub from the first gas passage formed to the second gas passage.

14. The CTIS of claim 11, wherein the sealing member includes a lip shaped to seat in direct face-sharing contact with the sealing surface of the wheel hub with no other components arranged between the lip and the sealing surface.

15. The CTIS of claim 11, wherein a first end of the second gas passage is arranged at the first gas passage and a second end of the second gas passage is arranged at an outlet fluidly coupled to a tire coupled to the wheel hub.

16. A method, comprising:
flowing gas across a seal engaged directly with a sealing surface of a wheel hub from a first gas passage formed in a stationary vehicle component to a second gas passage formed in the wheel hub, wherein the first gas passage comprises an angled connector configured to reverse gas flow toward a chamber between the first gas passage and the second gas passage, wherein the gas flow enters the angled connector in a first direction and exits the angled connector in a second direction, opposite the first direction, toward the chamber, wherein flowing the gas across the seal includes flowing the gas through the chamber bordered by the seal, and wherein the chamber is arranged between an outlet of the angled connector and the first gas passage.

17. The method of claim 16, further comprising flowing the gas from the second gas passage to a tire coupled to the wheel hub.

* * * * *